(12) United States Patent
Ross

(10) Patent No.: US 8,949,822 B2
(45) Date of Patent: Feb. 3, 2015

(54) SYSTEM, METHOD AND PROGRAM PRODUCT TO MANAGE INSTALLATION OF PROGRAMS

(75) Inventor: Richard Martin Ross, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 519 days.

(21) Appl. No.: 12/958,574

(22) Filed: Dec. 2, 2010

(65) Prior Publication Data
US 2012/0144385 A1 Jun. 7, 2012

(51) Int. Cl.
*G06F 9/44* (2006.01)
*G06F 9/445* (2006.01)

(52) U.S. Cl.
CPC ...................................... *G06F 8/61* (2013.01)
USPC .......................................................... 717/174

(58) Field of Classification Search
CPC .......................................................... G06F 8/61
USPC .......................................................... 717/174
See application file for complete search history.

(56) References Cited

U.S. PATENT DOCUMENTS

| | | | |
|---|---|---|---|
| 6,598,225 B1 * | 7/2003 | Curtis et al. | 717/175 |
| 7,140,013 B2 * | 11/2006 | Te'eni et al. | 717/173 |
| 7,210,143 B2 | 4/2007 | Or et al. | |
| 2005/0144617 A1 | 6/2005 | Chefalas et al. | |
| 2005/0172283 A1 * | 8/2005 | Delo | 717/174 |
| 2006/0048137 A1 * | 3/2006 | Nosseir et al. | 717/174 |
| 2006/0195508 A1 * | 8/2006 | Bernardin et al. | 709/203 |
| 2007/0006222 A1 * | 1/2007 | Maier et al. | 717/174 |
| 2008/0028389 A1 * | 1/2008 | Genty et al. | 717/174 |
| 2008/0126773 A1 * | 5/2008 | Martinez et al. | 713/1 |
| 2008/0244564 A1 * | 10/2008 | Sonkin et al. | 717/175 |
| 2009/0157803 A1 * | 6/2009 | Haggis et al. | 709/203 |
| 2009/0320014 A1 * | 12/2009 | Sudhakar | 717/169 |
| 2010/0333086 A1 * | 12/2010 | Prabu et al. | 717/178 |
| 2011/0296377 A1 * | 12/2011 | Morozov et al. | 717/113 |

(Continued)

OTHER PUBLICATIONS

Dave, Script to Check Adobe Version and update if needed, Transmitter Down (Nov. 3, 2009) retrieved from http://transmitterdown.wordpress.com/2009/11/03/script-to-check-adobe-version-and-update-if-needed/ on Oct. 18, 2013.*

(Continued)

*Primary Examiner* — Don Wong
*Assistant Examiner* — Theodore Hebert
(74) *Attorney, Agent, or Firm* — Arthur Samodovitz; Robert C. Rolnik

(57) ABSTRACT

A system, method and computer program product for controlling execution of a script program programmed to install a computer program is disclosed. An installation computer begins execution of the script program, and before a line or stanza of the script program is executed to initiate installation of the computer program, the installation computer determines that the line or stanza is programmed to initiate installation of the computer program. In response, the installation computer determines if the computer program is already installed. If the computer program is already installed, the installation computer skips the line or stanza of the script program so the script program will not attempt to install the computer program. However, if not, the installation computer continues to execute the script program including the line or stanza programmed to initiate installation of the computer program, such that the script program attempts to install the computer program.

9 Claims, 7 Drawing Sheets

(56) References Cited

U.S. PATENT DOCUMENTS

2011/0321034 A1* 12/2011 Schiemann .................. 717/174
2012/0144385 A1* 6/2012 Ross ............................ 717/174

OTHER PUBLICATIONS

Brother, Scanner driver install for network, Brother Industries, Ltd. (Nov. 19, 2009) retrieved from https://web.archive.org/web/20091119093811/http://welcome.solutions.brother.com/bsc/public_s/id/linux/en/instruction_scn1b.html on Dec. 29, 2013.*

Hewlett Packard; HP SmartStart Scripting Toolkit Linux Edition, User Guide, Hewlett Packard, Jun. 2010.

Command-Line Scripting, Quartus II Handbook Version 10.0 vol. 2: Design Implementation and Optimization; Altera Corporation; Jul. 2010.

Papageorgiou, DG. et al.;Merlin-3.1.1. A new version of the Merlin optimization environment; Computer Physics Communications; May 1, 2004; Vaolume 159 Issue 1; Elsevier B.V.

* cited by examiner

| <Product name> : 301 |
|---|
| <Stanzatype> =<Stanzaname> 303 |
| ••• |
| |
| RESERVED |
| = 305 |
| : 307 |
| # 308 |
| % 309 |
| %ONERROR STOP\|PAUSE\|CONTINUE 311 |
| INSTALLED 313 |

330

| <stanzaname> : 331 |
|---|
| <OS-Command as modified by variable> 333 |
| or |
| PERL-style variable setting 335 |
| or |
| Error Handling Directive 337 |
| or |
| Comment 339 |
| or |
| Installed test 341 |
| |
| ••• |

FIG. 4A

```
401  INSTALLDB2:
403    INSTALL=INSTALLORNOT
```

FIG. 4B

```
405  INSTALLORNOT:
     installed /opt/IBM/db2/V95/install/db2ls -c 2>/dev/null \
     | grep -v "^#" | cut -d : -f 2 | cut -d "." -f 1-2 \
407  | grep "9.5"
409  /mnt/ITIM/5.1/DB2v9.5/db2_install -b /opt/IBM/db2/V9.5 -p \
     ese -f NOTSAMP;
```

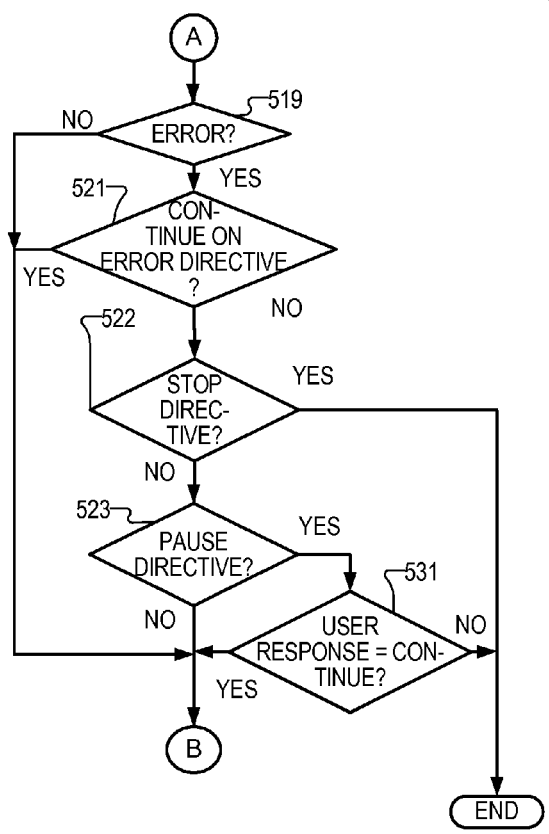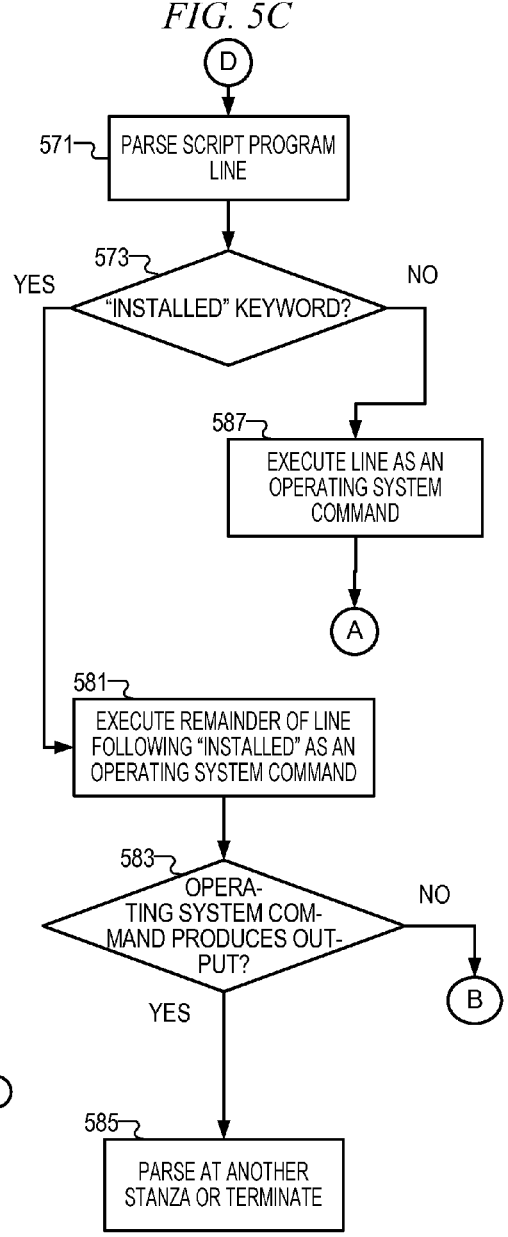

*FIG. 6A*

```
        # install db2 9.5
        #put VARS first to make it easy to find and change
601 ─┐  VARS:
     └─ %DB2VG=db2vg ─── 602
        %INSTITIMPW=test99pw
        %ITIMUSERPW=test99pw
        %DB2FENC1PW=test99pw
629 ─┐  %GECOS=Richard Ross; 897/P/12345 ;richard@us.ibm.com
     └─

DB2:
600 ─┐  commands=VARS ─── 691
     └─ filesystems=DB2FS
        groups=DB2GROUPS
        userids=DB2IDS                    ⎫
        commands=DB2PRE                   ⎬ 650
        install=DB2PRODUCT                ⎪
        install=DB2FIXES                  ⎭
        commands=DB2CFG DB2FS:  ─── 605
        vg=%DB2VG
        /db2home db2homelv 1PP ─── 617C
        /db2home/institim db2homeitimlv 32PP
        /db2home/institim/db2data/itimdb/tempspace db2hometemplv 4PP
        /db2home/institim/db2data/actlog_itimdb db2homeloglv 20PP
        /db2home/institim/db2data/arclog_itimdb db2homearclv 20PP
        /db2backup db2backuplv 32PP
        /opt/IBM/db2/V9.5 db2prod 30PP
        minfree /tmp 200M ─── 610

DB2GROUPS:
        dbadmin adms=root
                                                ─── 617B
        DB2IDS:
        institim:%INSTITIMPW pgrp=dbadmin groups=dbadmin home=/db2home/institim gecos="%GECOS"
        itimuser:%ITIMUSERPW pgrp=staff home=/home/itimuser gecos="%GECOS"
        db2fenc1:%DB2FENC1PW pgrp=staff home=/home/db2fenc1 gecos="%GECOS"
        chuser fsize=-1 cpu=-1 data=-1 stack=-1 fsize_hard=-1 cpu_hard=-1 data_hard=-1 stack_hard=-1 root
```

*FIG. 6B*

617 DB2PRE:
chown institim:dbadmin /db2home/institim
chmod 775 /db2home/institim
if [[ ! -f /db2home/institim/.profile ]] then  \
  cp -p /etc/security/.profile /db2home/institim/.profile; \
  cat /usr/local/bin/add.profile >> /db2home/institim/.profile; \
  chown institim:dbadmin /db2home/institim/.profile; \
fi
chown institim:dbadmin /db2home/institim/db2data/itimdb/tempspace
chmod 775 /db2home/institim/db2data/itimdb/tempspace
chown institim:dbadmin /db2home/institim/db2data
chmod 775 /db2home/institim/db2data
chown institim:dbadmin /db2home/institim/db2data/actlog_itimdb
chmod 775 /db2home/institim/db2data/actlog_itimdb
chown institim:dbadmin /db2home/institim/db2data/arclog_itimdb
chmod 775 /db2home/institim/db2data/arclog_itimdb
chown institim:dbadmin /db2backup
chmod 775 /db2backup
chmod 775 /opt/IBM
chmod 775 /opt/IBM/db2
if [[ -d /opt/IBM/db2/V9.5/lost+found ]] then \
  rmdir /opt/IBM/db2/V9.5/lost+found; \
fi
chmod 775 /opt/IBM/db2/V9.5

617D DB2PRODUCT:
mount=b03eicws003:/newimage /mnt
673A installed `/opt/IBM/db2/V9.5/install/db2ls -c 2>/dev/null | grep -v "^#" | cut -d : -f 2 | cut -d "." -f 1-2`" | \
  grep "9.5"
673B # Install DB2 version 9.5
/mnt/ITIM/5.1/DB2v9.5/db2_install -b /opt/IBM/db2/V9.5 -p ese -f NOTSAMP
Install the DB2 license
if [[ `/opt/IBM/db2/V9.5/adm/db2licm -l | grep -c "License not registered"` -gt 0 ]] then \
  /opt/IBM/db2/V9.5/adm/db2licm -a /mnt/ITIM/5.1/DB2v9.5_Restricted_Activation/db2/license/db2ese_o.lic; \
fi

*FIG. 6C*

```
# Copy the start and stop scripts for db2
if [[ ! -f /usr/local/bin/start_institim ]] then \
  cp -p /mnt/ITIM/itim51/start_institim /usr/local/bin/start_institim; \
fi
if [[ ! -f /usr/local/bin/stop_institim ]] then \
  cp -p /mnt/ITIM/itim51/stop_institim /usr/local/bin/stop_institim; \
fi
# copy the list of db2 command that will be used to create the database instance
cp /mnt/ITIM/itim51/create_db2.cmds /tmp/create_db2.cmds
chown institim /tmp/create_db2.cmds DB2FIXES:
mount=b03eicws003:/ptfs /mnt
installed `/opt/IBM/db2/V9.5/install/db2ls -c 2>/dev/null | grep -v "^#" | cut -d : -f 3` | grep "5"
# Install fixpack 5 for DB2 version 9.5
cd /mnt/DB2/9.5/FP5/server; \
./installFixPack -b /opt/IBM/db2/V9.5 -f update -n DB2CFG:
database is itimdb
grep -c "db2c_institim" /etc/services || echo "db2c_institim  50000/tcp" >> /etc/services
# Turn off world write for DB2
find /opt/IBM/db2/V9.5 -perm -004 -exec chmod o-w {} \;
# Create the instance
if [[ `/opt/IBM/db2/V9.5/bin/db2ilist | grep -c institim` -eq 0 ]] then \
    /opt/IBM/db2/V9.5/instance/db2icrt -u db2fenc1 institim; \
fi
# Start db2
su - institim -c /db2home/institim/sqllib/adm/db2start
# Create the database on the instance and tune it
if [[ `su - institim -c "db2 list db directory 2>/dev/null" | grep -c ITIMDB` -eq 0 ]] then \
  su - institim -c "db2 -vf /tmp/create_db2.cmds"; \
  NUMIOC=`lslv -l db2homeitimlv | egrep "disk|path" | wc -l`; \
  let NUMIOS=NUMIOC*3; \
  su - institim -c "db2 update db cfg for ITIMDB using num_iocleaners $NUMIOC"; \
  su - institim -c "db2 update db cfg for ITIMDB using num_ioservers $NUMIOS"; \
fi
# Set the database to use tcpip
if [[ `su - institim -c /db2home/institim/sqllib/adm/db2set -all DB2COMM | grep -c tcpip` -eq 0 ]] then \
  su - institim -c /db2home/institim/sqllib/adm/db2set DB2COMM=tcpip; \
fi
/usr/local/bin/stop_institim
su - institim -c /db2home/institim/sqllib/adm/db2start
su - institim -c 'db2 backup db itimdb to /dev/null'
su - institim -c 'db2 activate db itimdb'
```

SYSTEM, METHOD AND PROGRAM PRODUCT TO MANAGE INSTALLATION OF PROGRAMS

BACKGROUND OF THE INVENTION

1. Field of the Invention

The present invention relates generally to a computer implemented method, data processing system, and computer program product for installing computer programs.

2. Description of the Related Art

Installation of new software, fixes and upgrades is a routine process that in a business environment is expected to occur without incidents. In other words, at a minimum, an installation of software should occur with little, if any, downtime. In addition, it is preferred that parts of the install process, and even precursor steps to the install process, are not re-executed—or if re-executed, are done while minimizing work performed by a person supervising the process.

Installation scripts, or install scripts, can be written for a generic or assumed configuration of a data processing system. An install script is a stored set of machine readable instructions that, when executed, reconfigure a computer to have a program stored to a file system, and specifically, to be within the executable path of one or more directories that are searched for executable files. Further preparatory reconfigurations may occur. For example, a computer executing the install script may change permissions and ownership for the program, create new file systems and directories, add new user accounts, and the like.

U.S. Pat. No. 6,598,225, to Curtis, provided installation assistance by supporting a programmer knowledgeable in writing install programs to write an install program that is applicable across multiple operating systems and environments. Among Curtis's embodiments is an installer tool kit based in use of Java™. Java is a trademark of Oracle, Inc. in the United States, other countries, or both.

U.S. Pat. No. 7,210,143, to Or, provided a two part installation for multitier applications. Or, by applying an application model, included static descriptions of the application and a run-time description of the application. Static descriptions include identification of the packages that make up the application, identification of specific installations of the packages and/or a description of static installation dependencies. The run-time description includes identification of managed services, identification of specific configurations of the managed services and/or run-time dependencies.

It was also known for an installation program to automatically install one or more programs in a computer. If either or both of these programs are currently installed in the computer, the installation program will delete the current copy of the program and install another copy of the program.

It was also known for an installation program to be programmed to automatically install one or more programs in a computer, but before the installation commences to query a configuration file of the computer to determine if any of the programs are already installed in the computer. If any of the programs are already installed in the computer, Or replaced the package or program. This way, if a package is already installed (or-pre-installed) and an update of the package is later checked-in, the updated package can be automatically installed (or pre-installed) in place of the previous version of the package. With pre-install, as described by Or, packages are pre-installed and the installation is completed post-cutover. In one approach, packages are pre-installed at a temporary location on the target device and then moved to the final destination post-cutover.

An object of the present invention is to improve the process of selectively installing computer programs.

SUMMARY OF THE INVENTION

The present invention resides in a system, method and computer program product for controlling execution of a script program programmed to install a computer program. An installation computer begins execution of the script program, and before a line or stanza of the script program is executed to initiate installation of the computer program, the installation computer determines that the line or stanza is programmed to initiate installation of the computer program. In response, the installation computer determines if the computer program is already installed. If the computer program is already installed, the installation computer skips the line or stanza of the script program so the script program will not attempt to install the computer program. However, if the computer program is not already installed, the installation computer continues to execute the script program including the line or stanza programmed to initiate installation of the computer program, such that the script program attempts to install the computer program.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a description of reserved words and allowable commands of a configuration script in accordance with an illustrative embodiment of the invention;

FIG. 4A is a main grouping of stanzas in accordance with an illustrative embodiment of the invention;

FIG. 4B is an install stanza in accordance with an illustrative embodiment of the invention;

FIGS. 5A-5C show flowcharts of an install engine optionally halting progress to wait for human remedial action in accordance with an illustrative embodiment of the invention; and FIGS. 6A-6C show an example of an script program that is interpreted in accordance with an illustrative embodiment of the invention.

DETAILED DESCRIPTION OF THE PREFERRED EMBODIMENT

Figure 1:
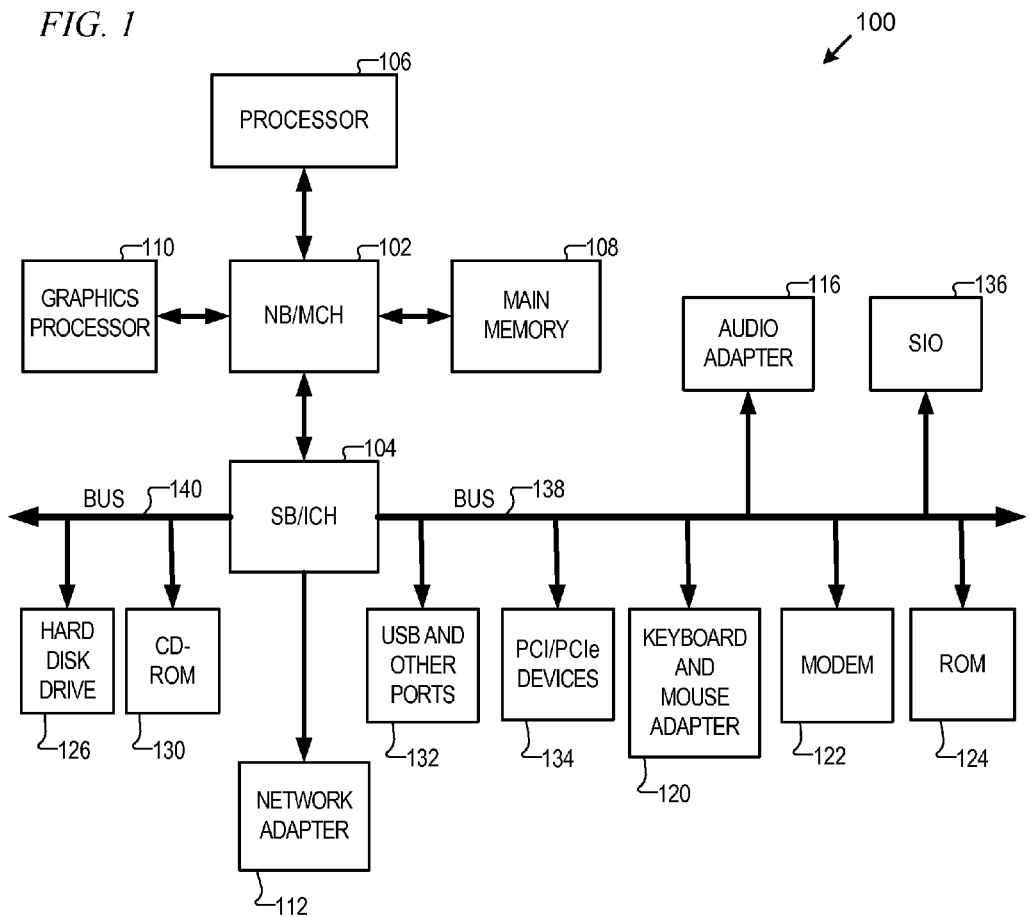
FIG. 1 is a block diagram of a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. A north bridge is a chipset that facilitates communication between the processor and main memory. A south bridge is a chipset that facilitates communications from processor to and among drives and other peripherals. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java programming system, may run in conjunction with the operating system and provides calls to the operating system from Java programs or applications executing on data processing system 100.

Instructions for the operating system, the object-oriented programming system, and applications or programs are located on computer readable tangible storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable device(s) having computer readable program code embodied thereon.

Any combination of one or more computer readable device(s) may be utilized. Examples of a computer readable tangible storage device include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The term "computer-readable storage device" does not encompass a signal propagation media examples of which include a copper cable, optical fiber or wireless transmission media.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable device that can direct a computer, other programmable data processing apparatus, or other devices to function in a particular manner, such that the instructions stored in the computer readable device produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
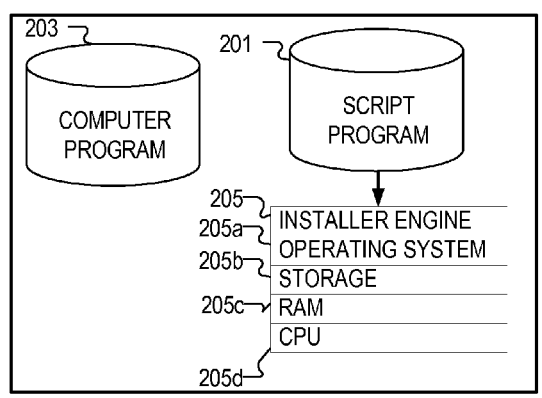
FIG. 2 is a configuration of an installer engine in accordance with an illustrative embodiment of the invention.

FIG. 2 is a configuration of an installer engine in accordance with an illustrative embodiment of the invention. Known installation scripts offer little to a person installing a computer program in terms of flexibility. Such installation scripts are made to persist in installing computer programs in target systems regardless of conditions that may be inhospitable to the correct installation of the computer program. A computer program is a set of instructions readable by a data processing system. The instructions may be natively in the form that the computer can process in a processor, in which case the instructions form object code. Alternatively, the instructions may be written in a programming language that is readable to people who are trained to edit the programming language. This second form of instructions may be interpreted code. Regardless of the form of the computer program, the computer program, when executed, can depend on certain assumptions concerning the availability of both hardware and software resources of a data processing system. In other words, a person installing the computer program is required to satisfy the assumptions by providing a hospitable hardware and software environment. A hospitable environment is necessary in order to successfully install the computer program so that all features of the computer program are available to users of the data processing system.

Even in hospitable environments, some steps by prior art installation scripts prove to be redundant, and even harmful, to the current environment. Embodiments, explained below, detect when commands or lines of a script program are about to be performed and skip such lines.

FIG. 2 includes a more specific description of an instance of data processing system 100. The installer engine 205 is program code that executes on operating system 205a while relying storage 205b, RAM 205c and CPU or processor 205d. Installer engine interacts with script program 201 to parse or otherwise execute commands in preparation for incorporating new features to the data processing system described in computer program 203. It is appreciated that computer program 203 may be temporarily stored in compressed form to temporarily available storage such as a CD-ROM, and the like. In addition, computer program 203 can be made available in a compressed format or even stored to a remote machine from data processing system 100. A script program is a file that is organized by groups of lines called stanzas. Each line can be formed from operating system commands, comments, reserved words or characters, or any combination of these items.

As an alternative to the hardware arrangement of FIG. 2, the installation of a computer program to a target computer may be accomplished by executing the installer engine on a second computer or installation computer. An installation computer is a computer that is configured to execute the installer engine and perform the steps of the script program. Accordingly, the installation computer may generate operating system commands from the script program and transmit the operating system commands free of any special syntax present in the script program. Thus, each operating system command can be received by the target computer, where the operating system command is executed natively according to the operating system syntax and capabilities of the target computer. The target computer is the computer that executes the operating system commands that can be embedded in the installation configuration file.

The illustrative embodiments permit a more streamlined installation using a configuration script. In addition, one or more embodiments may permit human intervention when an error is detected, without the need for an operator to manually restart an install script from the beginning Still further, one or more embodiments may permit easy revision to a configuration script, for example, by changing an assignment to a variable that may be used to signal or as a criteria for detecting previous installations of a prerequisite program or data structure.

FIG. 3 is a description of reserved words and allowable commands of a configuration script in accordance with an illustrative embodiment of the invention. A script program begins with a main stanza that includes at least two lines. These lines are product name line 301 and a descriptor of a first non-main stanza, described in stanza name 303. The main stanza may also be called a product name stanza, and for human readability purposes, uses a name identical to the software product that is to be installed at the product name line. A configuration script may contain multiple main stanzas to allow for the installation of more than one product. A stanza is a grouping of lines with no more than a single carriage return or line feed between each. A stanza permits execution of each line in sequence, unless excluded by either an operating system conditional statement or by an 'installed' reserved word. Nevertheless, a main stanza can organize subordinate stanzas. As such, at each line of the main stanza, a subordinate stanza can be identified, for example, by a product name. Execution and/or parsing of the main stanza may cause execution to jump, in a manner similar to a function call, to the respective lines of functionality later in the configuration script. Eventually, the subordinate lines of the called stanza complete, and parsing/execution may resume selecting the next stanza in a list of stanzas identified in the main stanza.

A script program differs from an install script in several ways. At a minimum, the script program can trigger an exit from executing a stanza when execution of a line including an operating system command generates output and the line is prefaced by the reserved word "installed", while install scripts do not feature such an easy cancellation or skipping of a stanza. Further differences will be apparent in the following description.

The non-main stanzas use descriptors that include a stanza type, and a stanza name 303. The stanza name can be arbitrarily selected. However, the stanza type may be one of five types, namely, commands, file systems, groups, user ids and install, relying on, respectively, reserved words such as commands, filesystems, groups, userids and install. Each stanza in the main or product name stanza can be executed in sequence when parsed and executed by the installer engine 205.

Stanza 330 is prefaced by a stanza name and a colon on the first line. Stanza name 331 matches a name present in the main stanza 300. Accordingly, an installer engine may thread execution from a main stanza to each respective stanza. Each stanza can comprise statements that can be one selected from a group. A first allowable statement is the operating system command, as modified by a variable, if any 333. The operating system command may be an AIX® command, that is, any command according to the syntax of an AIX operating system. AIX is a registered trademark of International Business Machines Corp. A second allowable statement is a PERL-style variable setting 335. A PERL-style variable setting is the setting of a variable using the syntax rules of the PERL computer programming language. A third allowable statement is an error handling directive 337. A fourth allowable statement is a comment 339. A fifth allowable statement is an installed test 341. Additional allowable statement types may also be present in the script program.

Reserved words or characters include equals ("=") 305, colon (":") 307, pound ("#") 308, as well as the percent ("%") 309. The percent can be a pre-selected prefix character to indicate the presence of a variable, for which substitution with a pre-selected string can be made during parsing of the script program. The pound can be used, when present as the first non-whitespace character in a line, as an indication that the line is a comment. "%onerror" is an error handling directive that is followed by one of three settings used to instruct the installer engine how to treat the occurrence of an error by any line of the script program. Allowed settings can be "stop", "pause", and "continue" 311. Operation of the error handling directive is explained further in FIGS. 5A-5C, below. In addition, the reserved word "installed" 313 is a signal to the installer engine to parse the remainder of the line as an operating system command. Any output generated by executing the operating system command is interpreted by the installer engine to skip the rest of the stanza in the script program. In other words, the determination that output occurred when executing the operating system command causes the installer engine to skip install steps or lines that remain unprocessed in the stanza where the "installed" line is located. An install step is a line of a script program including characters that are logically part of the line as coupled through a backslash ('\') (see for example lines 407 and 409, below).

FIGS. 4A and 4B illustrate some of the syntax related to the reserved words described above. FIG. 4A is an exemplary main grouping of stanzas in accordance with an illustrative embodiment of the invention. The product name is INSTALLDB2 401. The one stanza referenced in the main stanza is INSTALLORNOT 403, which is an install type of stanza.

FIG. 4B is an exemplary install stanza in accordance with an illustrative embodiment of the invention. The INSTALLORNOT stanza is labeled in a first line 405. A second line 407 is prefaced by the reserved word "installed", which the installer engine specially treats. The remainder of line 407 is an operating system command. In this case, the operating system command will generate output when a listing of the directory "/opt/IBM/db2/V95/install/db21s-c" command returns a match for "9.5" associated with a version of DB2. As such, the installer engine interprets the presence of output caused by line 407 as indicating that a component or prerequisite software is already installed to the data processing system. Accordingly, a way to detect prior installation of a computer program is to use an operating system command that filters for text identical to a version name of the computer program. Alternatively, a search for text identical to a feature name of the program to be installed can also signal prior installation when such text is found.

On the other hand, if no output is generated at line 407, the installer engine may continue to further parse and/or execute remaining lines in the stanza, including line 409. Line 409 may be a line that partly or completely results in the installation of a computer program that is either the computer program that is desired to be installed, or a prerequisite component software on which the target program, for example, computer program 203 of FIG. 2, depends. A target file is a prerequisite component or data structure that is necessary for complete installation of a target program. Other prerequisites to computer program installation can include any data structure or setting that is interdependent with a computer program's execution in a manner to provide the full functionality associated with the computer program. A prerequisite to computer program installation can include a file, a userid, a group, or a file system characteristic. A prerequisite file is a file that is a prerequisite to computer program installation.

In the example, configuration installation file of FIGS. 4A and 4B, the line 409, when executed by an installation engine, is an attempt to install the computer program. It is appreciated that the use of a variable can be used in place of the "9.5" on line 407 to add flexibility. As such, a variable can define a version of the file, against which a operating system command can compare currently available files. A version of the file is a string identifier of the file used in a file name, or within a data structure of a file.

Figure 5A:
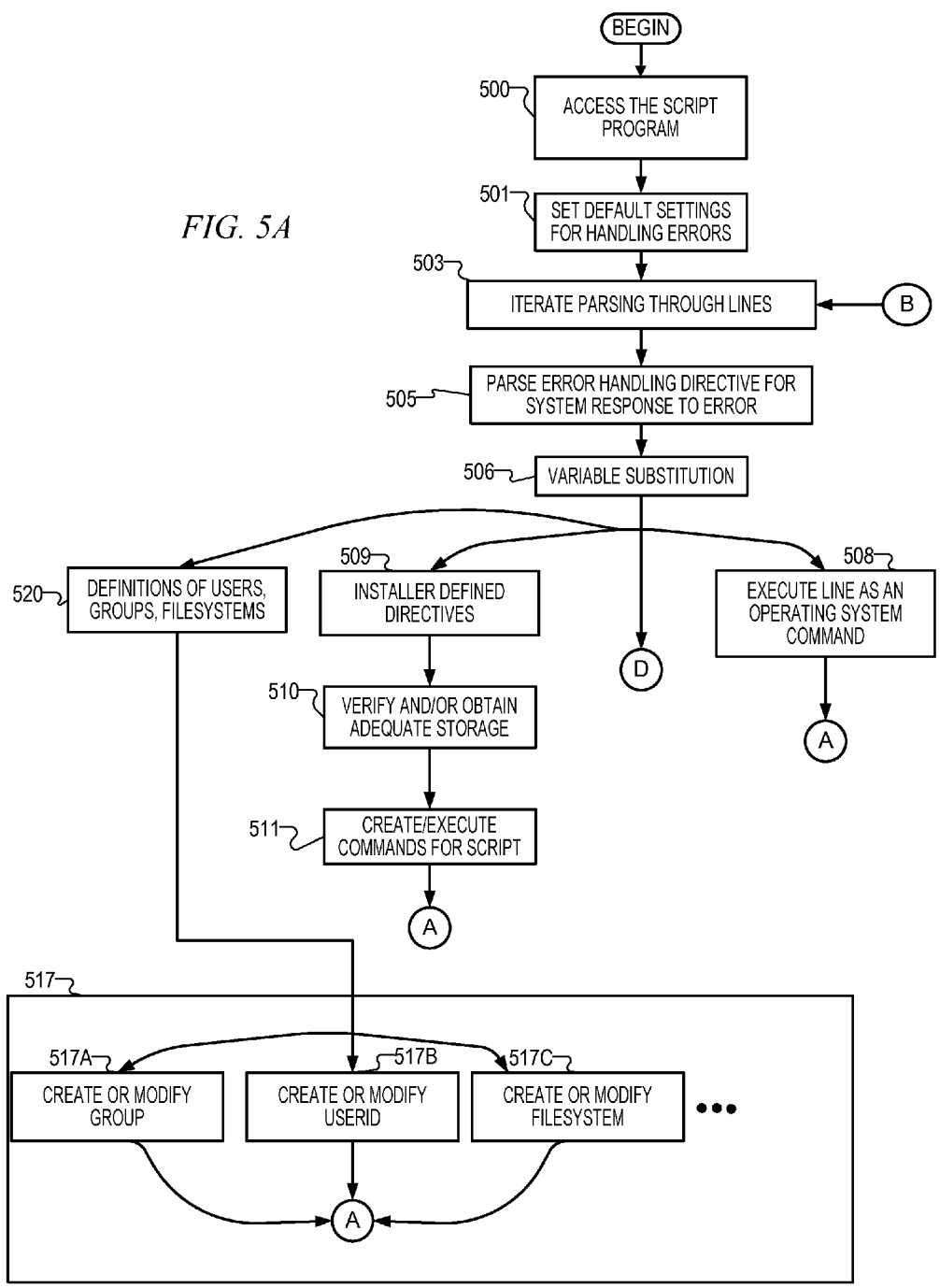

FIGS. 5A-5C show flowcharts of an installer engine optionally halting progress to wait for human remedial action in accordance with an illustrative embodiment of the invention. FIGS. 6A-6C explain, with reference to examples of specific exemplary configuration file lines, the manner that steps in FIGS. 5A-5C are treated for those lines. Initially, a user may trigger execution of the installer engine by the data processing system. Accordingly, the operating system may receive a command that invokes the installer engine as well as specifies the script program. The installer engine then looks up, opens the file, and begins processing the file line by line either by storing the file contents to a data structure in memory, or reading each line incrementally from storage. These steps, together, are steps of accessing the script program (step 500). The remaining steps of FIGS. 5A-5C are made with reference to the script program specified and opened in this manner. As explained above, the script program may be stored to storage, see for example, script program 201 of FIG. 2. Next, the installer engine sets default settings for handling errors in executing lines in each of the stanzas (step 501). In the example of FIGS. 6A-6C below, no %onerror directive is present. Accordingly, default settings can be made depending on the type of stanza being processed. Table 1 illustrates possible default associations of %ONERROR to each stanza type.

TABLE 1

| Type of Stanza | Default % onerror setting for error handling |
|---|---|
| Command | Continue |
| Filesystem | Stop |
| Group | Stop |
| Userid | Stop |
| Install | continue |

The installer engine may treat errors arising from stanzas as a stop. In other words, the detection of errors, by default, will cause the installer engine to stop parsing and executing the script program. On the other hand, the installer engine may treat errors in stanzas of types "command" and "install" as, by default, using the "continue" error handling directive. An error handling directive is an indication that defines how to treat errors, for example, "stop", "continue" or "pause". Accordingly, processing of the stanza by the installer engine will continue after the error without pausing or stopping. The installer engine iterates parsing through lines of the stanza (step 503). Next, the installer engine may parse an error handling directive (%onerror), if present, for a system response to an error (step 505). Accordingly, the installer engine sets the error handling directive to "stop", "continue" or "pause" per the script program. Such a setting may override the handling of errors as established in step 501.

The lines of the script program can be directed to forming file systems, user ids, groups or other subjects including the copying of files to the file system. For each line, the installer engine may make variable substitutions when a variable is detected (step 506). Detection includes searching for a preselected prefix character, as described in FIG. 3, prefix character 309.

A line of an installation configuration file script can be of varying types. Some lines define installer directives. Some lines are purely operating system commands. Other lines can be both operating system commands, but more specifically, are directed to installation phases related to groups, userids and filesystems. Accordingly, depending on the syntax of the line, and sometimes, the stanza in which a line appears, different branches of processing occur with respect to the line. Accordingly, FIG. 5A splits after step 506, depending on the content of the line of the script program.

Accordingly, the installer engine may have built-in directives (step 509) that may be prepared to detect the presence of a file or any other data structure that might signal that at least one component or prerequisite data structure is already present or needs to be configured. Thus, the installer engine determines whether a component or prerequisite data structure is present. Components can include a file, or an amount of disk space, or other similar resources. Line 610 of FIG. 6A is an example of such an installer defined directive. Such a step is performed by executing a conditional statement using a scripting language of the operating system. As a way to prepare installation, the installer engine obtains or otherwise verifies adequate storage (step 510). Adequate storage is a predetermined amount of storage established by developers of the computer program to allow dynamic storage during computer program execution as well as a sufficient storage to accommodate growth of data structures used long term. Accordingly, the installer engine adds additional storage in case adequate storage is unavailable, for example, by including an operating system command and a reference to a file system and quantity of storage space. Next, the installer engine creates commands for a script, and as needed, execute those commands (step 511).

In an alternative step after step 506, the installer engine may receive definitions of users, groups, or filesystems (step 520). Next, the installer engine determines if creation or modification of a user, group, or filesystem is necessary (step 517). If a creation or modification is necessary, the installer engine will generate the appropriate commands. The commands can be one selected to create or modify a group (step 517A). A group is a set of userids, which may be an empty set. The commands may be to create or modify a userid (step 517B). A userid is an account associated with a single user, based on the user presenting correct credentials at login time. A user account command is any command that accesses, deletes or creates a userid. A create user account command creates a user account in response to execution in a data processing system. The user account includes at least a user name, a password, and a definition of permitted access rights. The commands may be to access, create, or modify a file system (or filesystem) (step 517C). A file system that is a target of the script program is a file system specified in the command to access, create, or modify the file system, using conventional naming techniques of the operating system that hosts the installer engine. If the commands modify the userid that is executing the installer engine and the modifications cannot be dynamically applied to the running userid, the installer engine will exit with appropriate messages. In the cases of commands for group step 517A, userid step 517B and filesystem step 517C, the installer engine next executes step 519 of FIG. 5B.

If the command is listed under a command stanza of the script program, the installer engine executes the stanza line as an operating system command (step 508). An operating system command is a command accessible from the command line of a computer hosting an operating system. An operating system command can be, for example, a command to list installed programs in a target computer. An operating system command can be a command to perform a search for a regular expression. Operating system commands can be used multiple times per line. However, if the command is a command from an install stanza type, the installer engine next executes step 571 of FIG. 5C.

FIG. 5C follows step 506 in the case of an install stanza with parsing script program line (step 571). Next, the installer engine may determine if the line includes the "installed" keyword (step 573). The presence of the installed keyword indicates that the line or stanza is programmed to initiate installation. In the case of the "installed" keyword being present, the installer engine executes the remainder of the line as an operating system command (step 581). Next, the installer engine determines whether the operating system command produces output (step 583). A positive evaluation is a determination that an operating system command produces output. If so, the installer engine skips the remaining steps in the stanza (step 585). The operating system command can be any conventional command according to the syntax of the operating system. Such commands are chosen by the author of the script program to locate indications that a program is installed or a data structure is set up as if the program is installed. Accordingly, one way that an operating system command produces output is searching for program names that include a version number, for example, by searching all files in the target install directory for a version number. A search can be conducted using search commands such as sed, awk, grep, and the like. Accordingly, step 583 can be read from the script program and sent to the operating system. The installer engine waits for the operating system to complete the command. If the command produces output, all unprocessed lines in the stanza are skipped per step 585. Conversely, if no output occurs (e.g. grep finds no match to the version), a next line in the stanza is, for example, read from the installation configuration file, and processed per step 503. Accordingly, the outcome of step 583 determines whether a next line or stanza is, in one case, executed to attempt to install the computer program or, in another case, skipped. A negative evaluation is a determination that the operating system command produces no output.

Following negative results at step 573, the installer engine executes the stanza line as an operating system command (step 587).

FIG. 5B shows steps that following results at step 508, 511, 517, or 587. Accordingly, the installer engine determines whether the last command produced an error (step 519). If an error occurred, the installer engine may determine if a continue on error directive had been made in one of the lines of the script program (step 521). If there was such a directive, the installer engine continues as normal (step 503). If no further lines are available, execution terminates. No further lines exist if there is a blank line following a last line of a main stanza.

However, if a continue on error directive was not present (or other directive present that indicates need for user response), execution continues from step 521 to cause the installer engine to determine whether a stop directive had been set (step 522). If so, processing terminates. Otherwise, the installer engine determines whether a pause directive had been set (step 523). If not, then the installer engine continues to step 503 and continues further if more lines are present in the script program.

However, if the installer engine determines a pause directive had been set, the installer engine waits to receive a user response. Accordingly, the installer engine may determine if the user response is to continue (step 531). The user response of "continue" may be an indication from the user that remedial steps are complete. Remedial steps can include changing permissions to a directory or file, among others. Accordingly, the user response can be a keyboard entry that indicates that a remedy is complete, at least complete from the perspective of the user. Following a user response of "continue", such as may occur when an installer investigates the cause of error and remedies the error, the installer engine may resume at step 503. In other words, the installer engine processes a next line of the script program. A next line is a line that appears below the currently executed line, but is not coupled to the currently executed line through a backslash ('\'), nor is prefaced by the comment character, pound ("#"). However, if the determination is that the user has not indicated "continue", processing may terminate.

FIGS. 6A-6C are examples of script programs that are interpreted, for example, according to flowcharts of FIGS. 5A-5C. The main stanza 650 is prefaced by the line "DB2:". The script program does not expressly set %onerror. Accordingly, the installer engine relies on default settings of %onerror for each stanza type, for example, as set forth in Table 1, above. Accordingly, the setting of %onerror defaults may occur before or during the parsing of the first line 600 of the main stanza. In addition, variable settings may be triggered in response to the installer engine referencing the first line of the main stanza 600 and interpreting that a first called stanza is the one labeled VARS 601.

Accordingly, the first line of VARS stanza is parsed, in this case, with the prefix of '%' which indicates a variable assignment. The installer engine interprets "%DB2VG=db2vg" 602 to indicate that the variable %DB2VG is assigned the string db2vg. The installer engine processes the remaining lines of VARS stanza until it reaches a blank line 629. After that, the installer engine resumes a next line in the main stanza, namely filesystems=DB2FS 691.

Processing eventually reaches the first line of DB2FS stanza, namely vg=%DB2VG 605. The installer engine performs a volume group command at this line, and in the remaining lines of this stanza. Further lines, such as line 617C, may be processed by the installer engine, for example, as described in step 517C of FIG. 5A. In the example of line 617C, the file system that is a target of the script program is /db2home. The installer engine processes the remainder of the DB2FS stanza, including the minfree directive 610 as described in steps 509, 510, and 511 of FIG. 5A. The installer engine can continue parsing lines and reach a first line of a userid stanza, namely line 617B. Line 617B may be processed according to step 517B of FIG. 5A.

FIG. 6B shows the continuation of the script program. DB2PRE is a stanza of a command type. Accordingly, command 617 is processed as an operating system command. In contrast, DB2PRODUCT is a stanza of type install type. Accordingly, line 617D is treated according to the "D" branch of step 517 of FIG. 5A, and further processed according to the steps of 571, and others, of FIG. 5C.

Conditional execution of a line may be determined by the installer engine parsing and otherwise processing line 673A. The line following "INSTALLED" is executed as an operating system command. Accordingly, the line 673A produces no output. The installer engine can continue to process line 673B, per the steps following step 573 in FIG. 5C. In the example line 673A, the operating system command includes a command to search for a version identifier of the program to be installed, in this case "9.5". Multiple commands may be piped ('|') together so that output of one command is further processed by another operating system command. A final command in such a pipeline, for example 'grep', generates output, if any, to the invoking application, in this case, the installer engine. Although the operating system commands described here are shown as examples, it is appreciated that other operating system commands can be used. For example, an operating system command can be a command executable at a command line of an operating system.

FIG. 6C shows the continuation of the script program example, FIG. 6A above, and shows the remaining lines of the DB2PRODUCT stanza.

The illustrative embodiments permit flexible execution of a script program in a manner to make the file, when operated by an installer engine, recover from errors occurring in individual step execution while permitting execution to resume at the point of error following a user intervention. In addition, some illustrative embodiments may intelligently refrain or skip installing or otherwise setting up data structures, that though required, are already present in one or more target data processing systems. Accordingly, fewer errors may occur, and greater speed can be obtained, among other benefits.

The illustrative embodiments are described relative to install commands of at least the AIX® operating system. AIX is a registered trademark of International Business Machines Corp. It is appreciated that install commands and operations of the data processing system may rely on any operating system as an interpreter for operating system commands. The scope of the invention includes other operating systems, for example, Unix®, Linux™, as well as other operating system shells. UNIX is a registered trademark of The Open Group. Linux is a trademark of Linus Torvalds.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable device providing program code for use by or in connection with a computer or any instruction execution system. For the purposes of this description, a computer-usable or computer readable device can be any tangible apparatus that can store the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or computer readable tangible storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product for controlling execution of a script program including a stanza to direct installation of a first version of a computer program in a target computer, the computer program product comprising:
   one or more computer-readable storage devices;
   the script program stored on one of the storage devices;
   program instructions, stored on at least one of the one or more storage devices as an installation program separate from the script program and separate from the computer program, to begin to execute a line of code in a beginning part of the stanza of the script program, the line including a non-alphanumeric character which directs the installation program computer to parse a remainder of the line as a command to an operating system in the target computer, the command requesting the operating system to determine if the first version of the computer program is already installed in the target computer by searching within at least one directory of the target computer for a name of the first version of the computer program or for a program feature of the first version of the computer program that does not appear within any other versions of the computer program or in a name of any version of the computer program, wherein the command to the operating system filters for text identical to the name of the program feature, and determine from a response of the operating system to the command whether the first version of the computer program is already installed in the target computer, and, if so, the installation program modifies the script program during execution of the script program to skip a remainder of the stanza of the script program to avoid re-installation of the first version of the computer program in the target computer, and if not, the installation program executes the remainder of the stanza of the script program to direct installation of the first version of the computer program in the target computer and to parse a command to create a user account, and in response, to create a user account specified in the command to create the user account.

2. The computer program product of claim 1, wherein the command to the operating system filters for a regular expression name of the program feature.

3. The computer program product of claim 1, wherein the target computer is not the same as the installation program computer.

4. A data processing system for controlling execution of a script program including a stanza to direct installation of a first version of a computer program in a target computer, the data processing system comprising: one or more processors, one or more computer-readable memories and one or more computer-readable storage devices;
   program instructions, stored on at least one of the one or more storage devices for execution as an installation program, which is separate from the script program and separate from the computer program, by at least one of the one or more processors via at least one of the one or more memories, to begin to execute a line of code in a beginning part of the stanza of the script program, the line including a non-alphanumeric character which directs the installation program computer to parse a remainder of the line as a command to an operating system in the target computer, the command requesting the operating system to determine if the first version of the computer program is already installed in the target computer by searching within at least one directory of the target computer for a name of the first version of the computer program or for a program feature of the first version of the computer program that does not appear within any other versions of the computer program or in a name of any version of the computer program, wherein the command to the operating system filters for text identical to the name of the program feature, and determine from a response of the operating system to the command whether the first version of the computer program is already installed in the target computer, and, if so, the installation program modifies the script program during execution of the script program to skip a remainder of the stanza of the script program to avoid re-installation of the first version of the computer program in the target computer, and if not, the installation program execute the remainder of the stanza of the script program to direct installation of the first version of the computer program in the target computer and to parse a command to create a user account, and in response, to create a user account specified in the command to create the user account.

5. The data processing system of claim 4, wherein the command to the operating system filters for a regular expression of the program feature.

6. The computer program product of claim 1 further comprising program instructions, stored on at least one of the one or more storage devices, to identify the remainder of the stanza from a pre-determined format of the stanza indicating an end of the stanza and a beginning of a next stanza in the script program, and to skip the remainder of the stanza which avoids re-installation of the computer program in the target computer to execute the next stanza in the script program.

7. The data processing system of claim 4 further comprise program instructions, stored on at least one of the one or more storage devices for execution by at least one of the one or more processors via at least one of the one or more memories, to identify the remainder of the stanza from a pre-determined format of the stanza indicating an end of the stanza and a beginning of a next stanza in the script program, and to skip the remainder of the stanza which avoids re-installation of the computer program in the target computer to execute the next stanza in the script program.

8. The computer program product of claim 1, wherein a name of the program feature is generated by the operating system command targeting the first version of the computer program, wherein the name of the program feature does not appear as output generated by the command to the operating system when used to target any other version of the computer program.

9. The data processing system of claim 4, wherein the name of a program feature is generated by the operating system command targeting the first version of the computer program, wherein the name of the program feature does not appear as output generated by the command to the operating system when used to target any other version of the computer program.

* * * * *